(12) United States Patent
Wickman et al.

(10) Patent No.: US 7,121,254 B2
(45) Date of Patent: Oct. 17, 2006

(54) COMPRESSION-IGNITED IC ENGINE AND METHOD OF OPERATION

(75) Inventors: David D. Wickman, Madison, WI (US); Carl-Anders Hergart, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/060,050

(22) Filed: Feb. 17, 2005

(65) Prior Publication Data
US 2006/0180121 A1    Aug. 17, 2006

(51) Int. Cl.
*F02B 7/00*    (2006.01)
*F02B 13/00*    (2006.01)

(52) U.S. Cl. ...................... 123/304; 123/431
(58) Field of Classification Search ............. 123/299, 123/300, 304, 27 GE, 525, 526, 568.11, 568.14, 123/575–577, 431; 701/103–105, 108, 110
See application file for complete search history.

(56) References Cited

U.S. PATENT DOCUMENTS

| 6,314,940 | B1 * | 11/2001 | Frey et al. ................. 123/431 |
| 6,463,907 | B1 * | 10/2002 | Hiltner ...................... 123/304 |
| 6,561,157 | B1 * | 5/2003 | zur Loye et al. ............ 123/295 |
| 6,637,382 | B1 * | 10/2003 | Brehob et al. .............. 123/25 J |
| 6,637,393 | B1 | 10/2003 | Sutherland ............... 123/145 A |
| 6,659,071 | B1 * | 12/2003 | LaPointe et al. ............ 123/299 |
| 6,662,785 | B1 | 12/2003 | Sloane et al. ............... 123/481 |
| 6,675,748 | B1 * | 1/2004 | Ancimer et al. .......... 123/27 R |
| 6,725,827 | B1 * | 4/2004 | Ueda et al. .................. 123/295 |
| 6,789,511 | B1 * | 9/2004 | Hertweck et al. ........... 123/1 A |
| 6,813,880 | B1 * | 11/2004 | Nishiyama et al. .......... 60/285 |
| 6,907,870 | B1 * | 6/2005 | zur Loye et al. ........... 123/594 |
| 6,953,030 | B1 * | 10/2005 | Linderyd et al. ...... 123/568.12 |
| 2004/0194737 | A1 * | 10/2004 | Miyashita ................. 123/48 C |

* cited by examiner

*Primary Examiner*—Hai Huynh
(74) *Attorney, Agent, or Firm*—Christopher DeVries

(57) ABSTRACT

The present invention is a compression ignition internal combustion engine and method of operation which expands the load limit of quietly operating a premixed charge compression ignition (PCCI) engine by injecting a secondary fuel B, in ratios lean of stoichiometric, either into the intake air stream or directly into the cylinder to form a homogeneous fuel B and air mixture. Near top dead center of the compression stroke, a PCCI-type direct injection of fuel A event is used to initiate combustion of both fuel A and B at the proper time. At low loads the combustion mode is characterized a PCCI-type with high EGR rates. At medium loads the combustion mode is that of homogeneous combustion of fuel B coupled with PCCI combustion of fuel A. At the highest loads the engine will revert to a conventional diesel combustion mode of fuel A to maintain power density.

9 Claims, 1 Drawing Sheet

COMPRESSION-IGNITED IC ENGINE AND METHOD OF OPERATION

TECHNICAL FIELD

The present invention relates to a compression ignition internal combustion engine having a dual fuel injection system and method of operation, thereby expanding the load range in which the compression-ignited engine can operate in premixed charge compression ignition (PCCI) mode without producing excessive amounts of oxides of nitrogen, soot, and noise.

BACKGROUND OF THE INVENTION

Internal combustion engines can generally be grouped into one of two classes, spark-ignited and compression-ignited engines. Spark-ignited engines typically operate by introducing a stoichiometric mixture of air and fuel into the cylinder of the engine. The piston then compresses this mixture, and at predetermined crankshaft angle, a spark plug will ignite the fuel and air mixture producing a flame front that propagates through the combustion chamber. The rapid increase in heat from the burned fuel triggers an increase in pressure which forces the piston downward in the cylinder. The ability to precisely time the combustion event through the use of a spark plug is a benefit of the spark-ignited engine. However, the spark-ignited engine may be somewhat inefficient since the compression ratio of the engine is kept to a lower than optimal level to avoid spark knock. Spark knock occurs when the fuel and air mixture ignites independently of the spark plug and may cause engine damage. Consequently, spark-ignited engines typically have compression ratios between 8 and 11.

The compression ignition engine, on the other hand, operates at relatively high compression ratio that is typically within the range of 15–22. This high compression ratio boosts the mechanical efficiency of the compression-ignited engine. The compression ignition engine operates by introducing unthrottled air into the cylinder, thereby increasing the efficiency over that of the throttled spark-ignited engine by decreasing pumping losses. In a traditional compression-ignited engine, the ignition timing is controlled by the injection of diesel fuel into the cylinder near the end of the compression stroke when the trapped air within the combustion chamber is of a sufficient temperature to ignite the fuel. The heat release of the combustion process causes an increase in in-cylinder pressure which then forces the piston downward in the same fashion as the spark-ignited engine.

The compression ignition engine, though efficient, can produce greater emissions than a spark-ignited engine. The two emission constituents that are of main concern are particulates or "soot" and oxides of nitrogen or NOx. Soot is formed in locally rich of stoichiometric areas within the combustion chamber. These overly rich areas occur due to the non-homogeneity of the fuel and air charge occasioned by the lack of adequate premixing of the fuel and air upon ignition. The formation of oxides of nitrogen is a function of combustion chemistry. The compression-ignited engine, due to its locally stoichiometric combustion, combusts the fuel and air mixture at high temperatures causing high NOx emissions in the exhaust stream. The expansion process occurs so quickly that the chemical reactions are frozen and the NOx quantities are unable to reach chemical equilibrium resulting in high engine-out NOx emissions. The treatment for NOx has traditionally been converter systems such as Selective Catalyst Reduction (SCR) for engines operating with lean of stoichiometric air and fuel ratios. The SCR system injects urea or ammonia into the exhaust stream to convert NOx into nitrogen and water. Engine designers may also seek to lower the temperature of combustion in a compression-ignited engine by decreasing the compression ratio. This may lessen NOx formation and may also lead to decreases in efficiency and difficulties starting at cold temperatures.

Recent interest in fuel efficiency and federally-mandated emission requirements has refocused efforts to develop highly efficient, low emission compression-ignited engines and modes of operation. Examples of such technologies are the Premixed Charge Compression Ignition (PCCI) and the Homogeneous Charge Compression Ignition (HCCI) modes of combustion. The PCCI mode of combustion incorporates a standard compression ignition combustion system with high rates of aggressively cooled exhaust gas recirculation (EGR) and an early start of injection (SOI) timing. The combination of high EGR rates and early SOI result in a long ignition delay period prior to the start of combustion (SOC). The ignition delay period exceeds the fuel injection duration during PCCI combustion resulting in a premixed combustion event at the SOC. The premixed nature of the fuel and air mixture, along with a high EGR rate, reduces the formation of locally rich, high temperature regions that contribute to soot formation. The high EGR rate acts as a charge diluent that suppresses the temperature of combustion below that which significant amounts of NOx are formed.

The PCCI combustion mode is effective at low engine speeds and loads where the amount of fuel injected is very low and the time available for premixing is very long. As the engine load increases, the amount of heat released in the rapid premixed burning process becomes large enough to create excessive combustion noise. This occurs even if there is sufficient premixing of the fuel and air during the ignition delay period. Excessive combustion noise is objectionable to consumers; consequently, PCCI combustion has a low engine load limit.

For a given noise constraint, HCCI combustion is capable of operating at higher engine loads than PCCI combustion since the nearly homogeneous fuel and air charge will result in lower localized temperature within the combustion chamber during combustion. Due to the low volatility inherent in diesel fuel, it is difficult to create a homogenous fuel and air mixture. To attempt such a mixture, early direct fuel injection must be used. A conventional diesel fuel injector has a wide injector spray cone, and the early injection timing required for HCCI combustion may cause significant fuel impingement on the cylinder wall. Fuel impingement on the cylinder wall inhibits the formation of a homogeneous fuel and air mixture and may cause fuel dilution of the lubricating oil. To correct these conditions, fuel injectors with different spray patterns and piston bowls to compliment the spray patterns are required. This is typically an expensive endeavor that requires much experimentation and development to perfect.

Premature ignition may occur with homogeneous fuel and air mixtures in compression-ignited engines. The high Cetane number of diesel fuel represents the relative ease in which the fuel and air mixture will ignite. This premature ignition can cause noise, poor performance, and engine damage in extreme cases. Therefore, to properly phase the SOC for an HCCI engine, a reduced compression ratio is necessary. This reduction in compression ratio will result in a decrease in efficiency. To maintain acceptable cold start performance, a high compression ratio must be maintained.

Therefore, a variable compression ratio engine system is often employed in an HCCI engine.

SUMMARY OF THE INVENTION

Accordingly, the present invention provides a dual fuel injection system for a compression-ignited internal combustion engine capable of operating in PCCI mode over a wide range of loads with both a highly premixed fuel A and air mixture and a homogeneous fuel B and air mixture without a premature start of combustion. The present invention also provides an operating strategy for a compression-ignited engine that is of high efficiency and low emissions.

The present invention utilizes a dual fuel injection system where, in one embodiment, gasoline is injected into the inlet air stream or directly into the cylinder of the PCCI capable engine to prevent the onset of premature SOC. A homogeneous fuel and air mixture can be created by injecting gasoline, in ratios lean of stoichiometric, into the intake port or intake runner of the engine. A homogeneous gasoline and air mixture may also be produced by injecting gasoline directly into the cylinder of the engine during the intake stroke or early in the compression stroke. This mixture is resistant to premature ignition due to the lean of stoichiometric fuel and air ratio as well as the relatively high octane rating of gasoline. The higher octane rating the lower the tendency of the fuel to autoignite. Near top dead center (TDC) of the compression stroke, a PCCI-type direct diesel fuel injection event can be used to initiate the SOC. After the heat release event of the diesel fuel, the homogeneous gasoline and air mixture will ignite and burn at a rate that is slow enough to suppress the creation of excessive combustion noise, but fast enough to maintain high efficiency. This dual fuel injection architecture will allow low emission premixed-type combustion to be utilized at much higher loads than a single fuel PCCI system. This system avoids the limitations involved with the single fuel HCCI engine, such as the need for variable compression ratio systems, fuel impingement on the cylinder wall, and fuel dilution of the lubricating oil.

Specialized and expensive diesel fuel system modifications can be avoided by the present invention. The secondary fuel system of the present invention is relatively inexpensive and is a highly developed system that is known to those in the art.

The present invention also provides a method of operating a compression-ignited engine that is of high efficiency and low emissions. The preferred operating strategy is to use PCCI combustion with direct injection of diesel fuel and high rates of aggressively cooled EGR for engine loads below the combustion noise limit. For engine loads above the noise limit, the proposed method of operation is HCCI combustion of a gasoline and air mixture and PCCI combustion of diesel fuel. The gasoline is injected by port fuel injection or direct injection, and ignition timing is controlled by PCCI combustion of diesel fuel near TDC of the compression stroke. For the highest loads, where the engine's power density is to be maintained, the system will revert to conventional diesel combustion mode. The transition points for each mode of operation are characterized by a speed and load map contained in the engine control unit. These transition points will vary with engine architectures. The engine load may be determined by the amount of fuel delivered to the cylinder, which is controlled by the engine control unit. Those skilled in the art may recognize other means for determining engine load, such as in-cylinder pressure transducers. The engine speed may be determined from the crankshaft position sensor or by other means known to those skilled in the art.

The internal combustion engine and method of operation described previously is but one embodiment of the present invention and the present invention may have multiple embodiments such as different fuels and different locations for the secondary fuel injector. The present invention allows the compression ignition internal combustion engine to be operated in the highly efficient PCCI mode over greater load conditions resulting in a controlled SOC and heat release rate, decreased NOx and soot emissions, and lessened combustion noise.

Accordingly, the present invention is a compression-ignited internal combustion engine with dual fuel injection capability operable in purely diesel combustion mode or in a premixed charge compression ignition mode which has a cylinder case containing at least one cylinder, a piston assembly operable within the cylinder, a cylinder head defining an inlet port and an exhaust port that is affixed to the cylinder case, a combustion chamber formed by the cylinder head and piston assembly, and an air intake. The internal combustion engine of the present invention has a primary fuel injector operable to inject a measured amount of a fuel A directly into the cylinder of the engine, and a secondary fuel injector operable to deliver a measured amount of fuel B to the same cylinder. An exhaust manifold in communication with the exhaust port of the cylinder head provides a conduit within which the exhaust gasses pass from the cylinder to the vehicle exhaust system. The exhaust manifold will have a small tap to allow exhaust gasses to be recirculated into the intake air stream via an EGR system that is controlled by the control unit. This control unit may also control the injector timing of the primary fuel injector and the secondary fuel injector to deliver the respective measured amounts of fuel A and fuel B.

The present invention provides a method of operation of the claimed compression-ignited internal combustion engine with dual fuel injection capability. At low engine loads, the control unit will command the EGR system to provide a high rate of aggressively cooled recirculated exhaust gas to the inlet air stream. Simultaneously, the control unit will command the primary fuel injector to inject a measured amount of fuel A sufficiently early in the compression stroke to provide the cylinder with a premixed fuel and air charge at the start of ignition. At moderate engine loads, the control unit will command the secondary fuel injector to inject a measured amount of fuel B either early in the intake stroke or early in the compression stroke of the piston by way of a secondary fuel injector located within the inlet air stream or, alternately, in the cylinder head so located to directly inject fuel B into the cylinder. This fueling strategy will allow the formation of a lean of stoichiometric homogeneous fuel B and air mixture within the cylinder. Subsequently, the control unit will command the primary fuel injector to inject a measured amount of fuel A directly into the cylinder when the piston assembly is near top dead center of the compression stroke. At high engine loads, the control unit will command the primary fuel injector to inject a measured amount of fuel A into the cylinder near the end of the compression stroke of the piston in a purely diesel combustion mode.

Fuel A and fuel B may be the same fuel or different fuels. In the preferred embodiment of the present invention, fuel A is diesel and fuel B is gasoline. The secondary fuel injector may be located in the air intake, the inlet port of the cylinder head, or within the head to directly inject fuel B into the cylinder.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
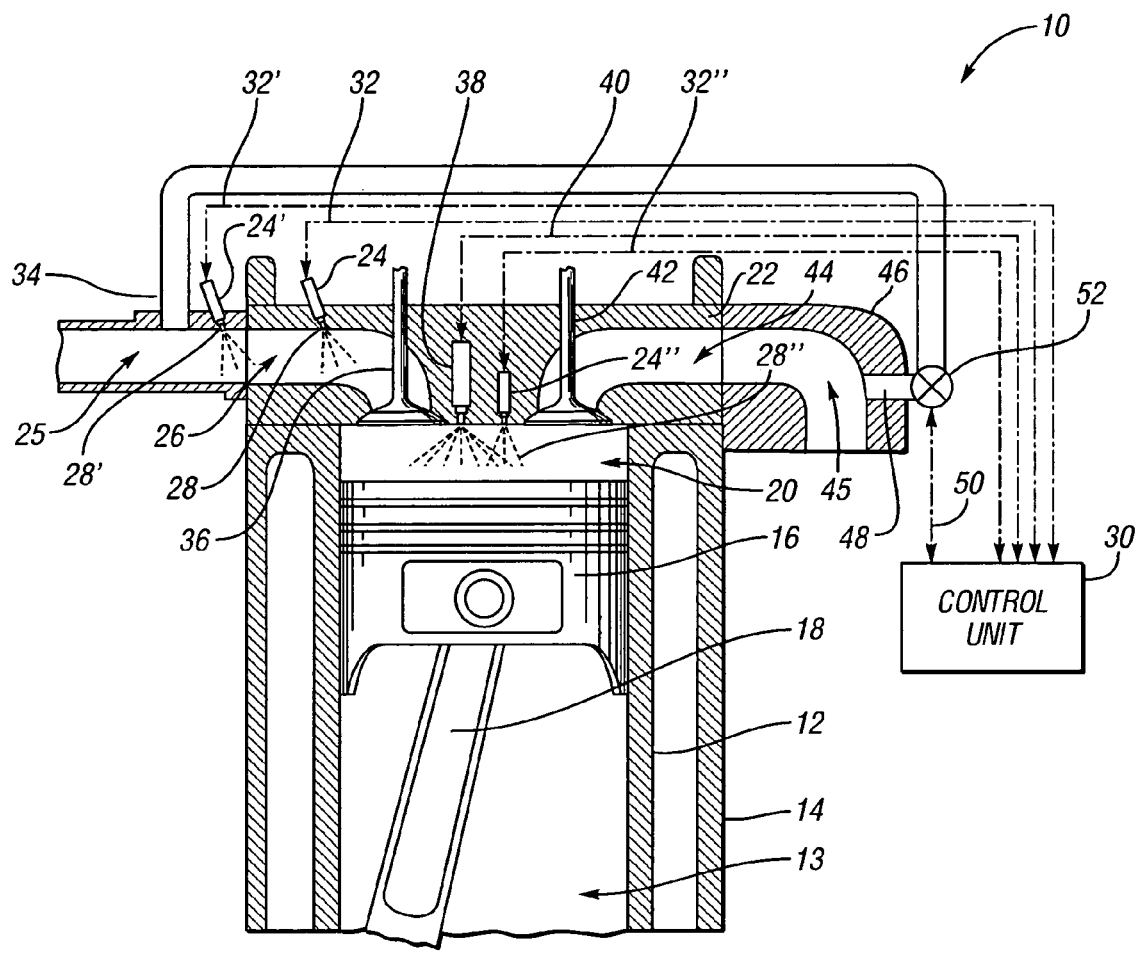
FIG. 1 is a sectional side view of a single cylinder compression-ignited internal combustion engine showing alternate locations for a secondary fuel injector located within the intake air stream of a compression ignition engine (within the air intake or alternately within the inlet port of the head) and an alternate location within the cylinder head to inject fuel directly into the combustion chamber.

Referring to FIG. 1, this figure presents an improved compression-ignited internal combustion engine 10 that is capable of operating in a premixed charge compression ignition mode over a much greater range of engine load conditions without producing excessive noise, soot emissions, and NOx emissions. This expanded range is facilitated by the use a dual fuel injection strategy. The compression ignition internal combustion engine 10 is characterized by a cylinder liner 12 enclosed by a cylinder case 14 and defining a cylinder bore 13 which reciprocally houses a piston 16. The piston 16 is connected to one extreme of the connecting rod 18. When the piston 16 is near TDC of the compression stroke, the bowl in the piston 16 forms a combustion chamber 20 with the cylinder head 22.

During the intake stroke of piston 16, a measured amount of fuel B will flow from the secondary fuel injector 24 into the inlet port 26 defined by the cylinder head 22. The secondary fuel injector 24 may be housed within the air intake runner 25 as secondary fuel injector 24' demonstrates. A measured amount of fuel B exits the secondary fuel injector 24 in a spray cone 28. This injection of fuel is precisely controlled by the control unit 30 through the electrical connection 32. Also located within the air intake runner 25 is an exhaust gas recirculation (EGR) injection port 34. The three constituents, air, fuel B, and EGR (if commanded), are then introduced into the cylinder bore 13 past the open intake valve 36. The fuel B and air mixture is nearly homogeneous due to the high volatility of fuel B as well as the favorable atomization qualities of the secondary fuel injector 24. The amount of fuel B introduced into the cylinder bore 13 during the intake stroke of the piston 16 is lean of stoichiometric to avoid the possibility of autoignition.

Upon completion of the intake stroke of the piston 16, the compression stroke begins. At which time, the piston 16 will begin to move upward in the cylinder bore 13. This upward motion of the piston 16 will compress the trapped air, fuel B, and EGR (if commanded) mixture. Simultaneously, the control unit 30 will command the primary fuel injector 38 by way of the electrical connection 40 to inject a measured amount of fuel A directly into the combustion chamber 20.

The primary fuel injector 38 injects a measured amount of fuel A early enough in the compression stroke of piston 16 to allow adequate premixing with the air, fuel B, and EGR (if commanded) mixture. This (PCCI)-type direct injection of fuel A can be used to initiate the SOC. Subsequent to the heat release event of the fuel A combustion event, the homogeneous fuel B and air mixture will ignite and burn at a rate that is slow enough to suppress the creation of excess combustion noise, but fast enough to maintain high efficiency. The fuel B and air mixture is resistant to autoignition due to the lean of stoichiometric nature of the mixture and the relatively high octane rating of fuel B. The higher the octane rating, the lower the tendency of the fuel to autoignite. This dual fuel injection architecture allows the low emission PCCI combustion mode to be utilized at much higher engine loads than a single fuel PCCI engine.

Upon completion of the combustion event within the combustion chamber 20, the rapidly expanding gases force the piston 16 downward in what is termed the expansion stroke. The exhaust stroke begins when the piston 16 reverses its motion at the bottom of the expansion stoke and begins to move an upward within the cylinder bore 13. The products of combustion, or exhaust gases, are forced from the cylinder bore 13 by the piston 16, past the open exhaust valve 42 and into the exhaust port 44 which is defined by a passage within the cylinder head 22. The products of combustion then pass into the exhaust manifold runner 45, defined by the exhaust manifold 46, to be vented to the atmosphere by the vehicle's exhaust system (not shown). However, some of the exhaust gases may enter the EGR passage 48 typically located within the exhaust manifold 46. The EGR rate is controlled by the control unit 30 via an electrical connection 50 with the EGR valve 52.

FIG. 1 demonstrates another embodiment of the present invention. In lieu if injecting fuel B into the intake air stream by the secondary fuel injector 24 or 24', fuel B may be directly injected into the cylinder bore 13 by the secondary fuel injector 24". The secondary fuel injector 24" is controlled by the control unit 30 by way of the electrical connection 32" to deliver a measured amount of fuel B into the cylinder bore 13. The injection may take place during the intake stroke or early in the compression stroke of piston 16. Fuel B should be injected with adequate time to allow a homogeneous fuel B and air mixture to form.

FIG. 1 illustrates a single cylinder engine for clarity. However, those skilled in the art will recognize that the present invention may be applied to multi-cylinder compression-ignited engines as well.

Figure 2:
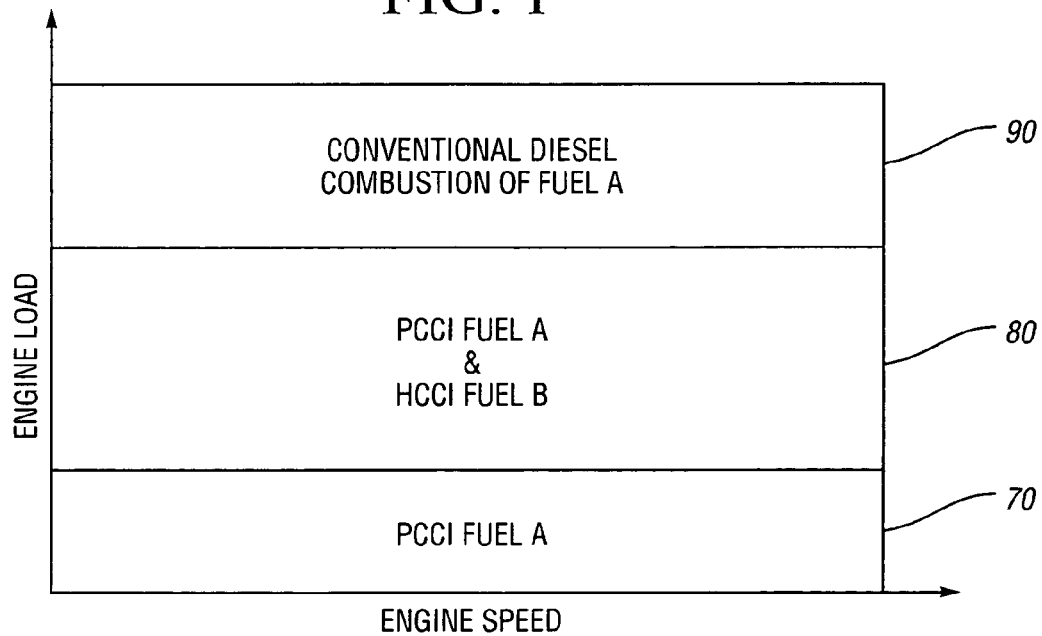
FIG. 2 is a graphical illustration representing the various engine speed and engine load regions and the respective operating modes for the engine of FIG. 1.

The preferred method of operation for the compression-ignited internal combustion engine 10 is represented graphically in FIG. 2. When operating in the low engine load region 70, the compression ignition engine 10 operates purely in the premixed charge compression ignition combustion mode. During which time, the control unit 30 will command a high rate of aggressively cooled EGR gas to be introduced by EGR port 34 into the intake air stream. The control unit 30 will also disallow the operation the secondary fuel injector 24. The EGR and air mixture will then enter the cylinder bore 13 and become compressed when the piston 16 moves upward in the cylinder bore 13 during the compression stroke. During the compression stroke the primary fuel injector 38 will be commanded by the control unit 30 to deliver a measured amount of fuel A directly into the cylinder bore 13. The timing of this injection event must be such so as to allow adequate time for fuel A to become premixed with the EGR and air mixture prior to the start of combustion. The premixed nature of combustion along with the high EGR rate prevents the formation of the locally rich areas of high temperature where soot emissions are formed. The high EGR rate will suppress the peak gas temperature to a level below that which significant amounts of NOx will form.

As the engine load increases, the amount of heat released during the rapid pre-mixed burning process becomes large enough to create excessive combustion noise. The control unit 30 will command the engine to operate in the second operating region 80. In this second operating region 80 the engine will operate using the dual fuel injection strategy that is the subject of the present invention. A measured amount of fuel B is injected into the intake air stream by the secondary fuel injectors 24 or 24' or may be directly injected into the cylinder bore 13 by a secondary fuel injector 24". The amount of fuel B is injected in fuel and air mixture ratios that are lean of stoichiometric. A nearly homogeneous fuel and air mixture is created which is resistant to autoignition due to the relatively high octane rating of fuel B and the lean fuel and air ratio. When piston 16 is near top dead center, the primary fuel injector 38 will inject a measured amount of fuel A, in PCCI-type injection mode, to initiate SOC at the proper time. Upon the completion of the heat release event of the combustion of fuel A, the homogeneous mixture of fuel B and air will subsequently burn. The fuel B and air mixture will burn at a rate sufficiently slow so as to not produce excessive combustion noise, but not so slow as to sacrifice combustion efficiency. Depending on the requirements of the engine 10, the EGR valve 52 may be commanded open or closed by the control unit 30 during the second operating region 80.

The third operating region 90 is characterized by high engine loads where maximum power and torque are required. The control unit 30 will disable the secondary fuel injector 24 and allow the engine 10 to operate in a purely conventional diesel combustion mode. In this mode the primary fuel injector 38 will inject a measured amount of fuel A late in the compression stroke to initiate the SOC.

The operating regions 70, 80, and 90 will be determined through experimentation with a particular engine. Different engine types have diverse operating characteristics that must to be comprehended when selecting the breakpoints for operating regions 70, 80, and 90.

The preferred embodiment would include gasoline as fuel B. Gasoline has a relatively high octane number and therefore is resistant to autoignition. The high volatility of gasoline provides a highly homogeneous fuel B and air charge. The preferred fuel A is diesel. Both diesel and gasoline are readily available to consumers and are therefore preferred, however one skilled in the art will notice that fuel A and fuel B may be different fuels as the preferred embodiment teaches or may be the same fuel. Fuel A and fuel B may be any type of combustible fuel in liquid form, such as gasoline, diesel, methanol, ethanol, etc., or in gaseous form, such as natural gas, propane, hydrogen, etc., without violating the spirit of what is claimed.

While the best modes for carrying out the invention have been described in detail, those familiar with the art to which this invention relates will recognize various alternative designs and embodiments for practicing the invention within the scope of the appended claims.

The invention claimed is:

1. A compression ignited internal combustion engine with dual fuel injection capability operable in a purely diesel combustion mode or in a premixed charge compression ignition mode, comprising:

a cylinder case containing at least one cylinder;

a piston assembly operable within said cylinder;

a cylinder head, defining an inlet port, affixed to said cylinder case and forming a combustion chamber with said piston when said piston is near top dead center of the compression stroke;

an air intake runner to communicate air to said inlet port;

a primary fuel injector operable to inject a measured amount of diesel fuel directly into said cylinder;

a secondary fuel injector operable to deliver a measured amount of gasoline to said cylinder;

an exhaust manifold for exhausting the products of the combustion process during the exhaust stroke of said piston assembly;

an exhaust gas recirculation system selectively interconnecting said exhaust manifold and said air intake runner and operable to provide an amount of recirculated exhaust gas to said cylinder; and a control module responsive to engine load for selectively controlling said primary fuel injector, said secondary fuel injector, and said exhaust gas recirculation system.

2. The internal combustion engine in claim 1, wherein said secondary fuel injector is located within said air intake runner.

3. The internal combustion engine in claim 1, wherein said secondary fuel injector is located within said inlet port of said cylinder head.

4. The internal combustion engine in claim 1, wherein said secondary fuel injector is located within said cylinder head to directly inject said gasoline into said cylinder.

5. A method of operating a compression ignited internal combustion engine with dual fuel injection capability comprising:

at low engine loads, commanding high rates of aggressively cooled recirculated exhaust gas to the cylinder of said engine, simultaneously commanding a primary fuel injector to inject a measured amount of diesel fuel near TDC of the compression stroke of the piston to provide a premixed diesel fuel and air charge at the start of ignition;

at moderate engine loads, commanding a secondary fuel injector to inject a measured amount of gasoline early in the intake stroke or alternately early in the compression stroke of said piston to form a lean of stoichiometric homogeneous gasoline and air mixture within said cylinder and, subsequently, commanding said primary fuel injector to inject a measured amount of said diesel fuel directly into said cylinder when said piston is near top dead center of the compression stroke; and at high engine loads, commanding said primary fuel injector to inject a measured amount of said diesel fuel into said cylinder near the end of the compression stroke of the piston in a conventional diesel combustion mode.

6. The method of operating a compression ignited internal combustion engine in claim 5, wherein said secondary fuel injector is located within an air intake runner of said engine.

7. The method of operating a compression ignited internal combustion engine in claim 5, wherein said secondary fuel injector is located within an inlet port of a cylinder head.

8. The method of operating a compression ignited internal combustion engine in claim 5, wherein said secondary fuel injector is located within a cylinder head to directly inject said gasoline into said cylinder.

9. A compression ignited internal combustion engine operable in a purely diesel combustion mode or in a premixed charge compression ignition mode, comprising:

a cylinder case containing at least one cylinder;

a piston assembly operable within said cylinder;

a cylinder head, having an inlet port and an exhaust port, affixed to said cylinder case and forming a combustion chamber with said piston when said piston is near top dead center of the compression stroke;

an air intake runner to communicate air to said inlet port;

a primary fuel injector operable to inject a measured amount of a diesel fuel directly into said cylinder;

a secondary fuel injector located within said air intake runner operable to deliver a measured amount of a gasoline to said cylinder;

an exhaust manifold for exhausting the burned contents of the combustion process during the exhaust stroke of said piston assembly;

an exhaust gas recirculation system selectively interconnecting said exhaust manifold and said air intake runner and operable to provide an amount of recirculated exhaust gas to said cylinder; and a control module capable of comprehending engine load and independently controlling said primary fuel injector, said secondary fuel injector and said exhaust gas recirculation system.

* * * * *